United States Patent

Wettlaufer

[11] Patent Number: 5,275,097
[45] Date of Patent: Jan. 4, 1994

[54] PRESS ASSEMBLY FOR EXTRACTING LIQUIDS FROM SOLIDS

[76] Inventor: Dale E. Wettlaufer, 842 Oakwood Ave., East Aurora, N.Y. 14052

[21] Appl. No.: 888,977

[22] Filed: May 26, 1992

[51] Int. Cl.$^5$ .............................................. B30B 9/06
[52] U.S. Cl. .................................. 100/113; 100/123; 100/131; 100/198
[58] Field of Search ........ 100/112–115, 122, 123, 131, 196–198; 210/225

[56] References Cited

U.S. PATENT DOCUMENTS

| | | |
|---|---|---|
| 218,879 | 8/1879 | Hartshorn . |
| 424,543 | 4/1890 | Diffey . |
| 626,646 | 6/1899 | Baggett . |
| 729,807 | 6/1903 | Stoveken et al. ............... 100/123 X |
| 801,872 | 10/1905 | Herr ................................. 100/113 X |
| 1,107,487 | 8/1914 | Brown . |
| 1,130,701 | 3/1915 | Berrigan .......................... 100/122 X |
| 2,091,623 | 8/1937 | Berrigan et al. ................. 100/123 X |
| 2,346,375 | 4/1944 | Harris . |
| 3,289,844 | 12/1966 | Emele . |
| 3,592,127 | 7/1971 | Cooley . |
| 4,076,033 | 2/1978 | Busse et al. . |
| 4,303,011 | 12/1981 | Reiner .............................. 100/123 X |
| 4,343,710 | 8/1982 | Shackleton et al. . |
| 4,892,665 | 1/1990 | Wettlaufer . |
| 4,900,436 | 2/1990 | Iwatani . |
| 5,037,540 | 8/1991 | Davis . |
| 5,045,186 | 9/1991 | Takashima . |

Primary Examiner—Stephen F. Gerrity
Attorney, Agent, or Firm—John C. Thompson

[57] ABSTRACT

A press assembly (10) for squeezing liquid from layers of liquid containing materials. The press assembly utilizes a plurality of open top filter bag assemblies (102), each filter bag assembly being disposed between adjacent press racks (86), the press racks being mounted on parallel horizontally extending rods (52) for sliding movement thereon, the rods in turn being supported between spaced apart platens (42, 54). When the press racks are moved towards one another to squeeze juice from the liquid containing material which is disposed within the filter bag assemblies, the juice will flow into a collector (176) mounted below the press racks. The press assembly is capable of inverting the press racks and filter bag assemblies after the press racks have been moved away from each other, the residue from within the filter bags being discharged onto a conveyer (220) mounted below the collector which has been moved from its operative position below the press racks to an inoperative position to the sides of the press racks.

18 Claims, 7 Drawing Sheets

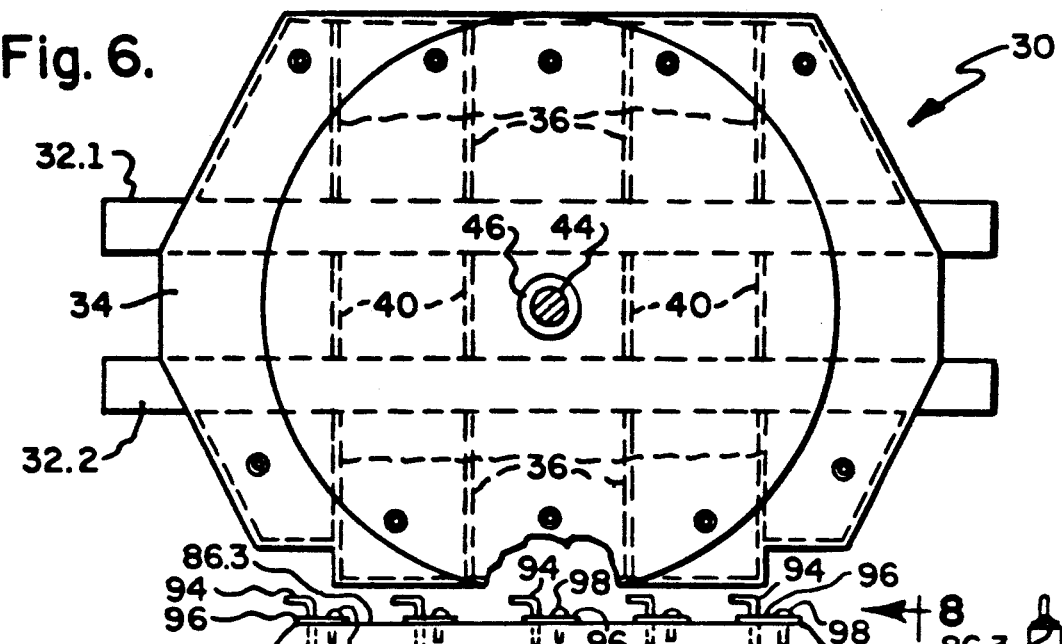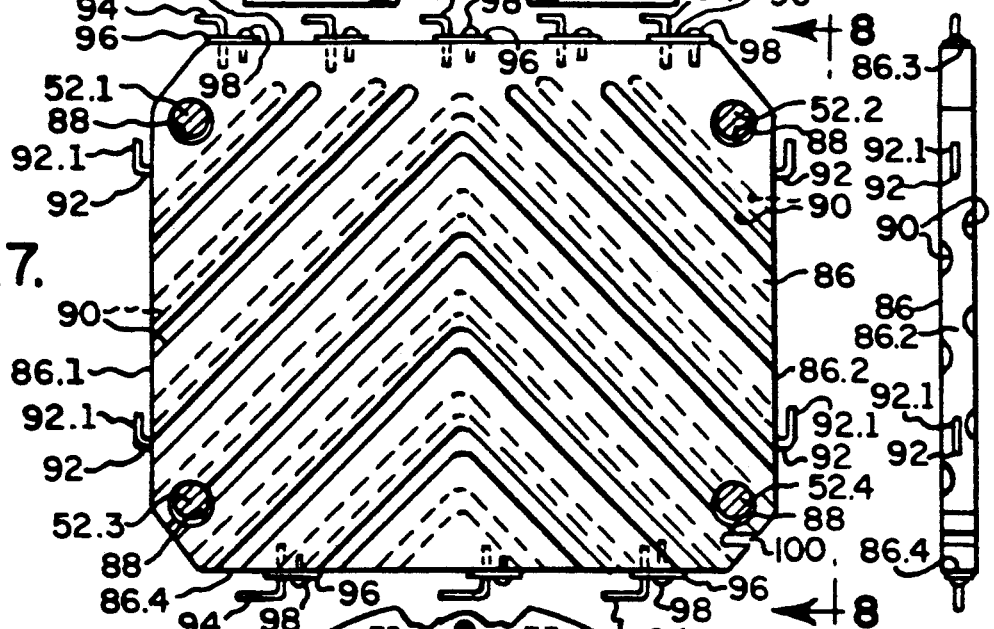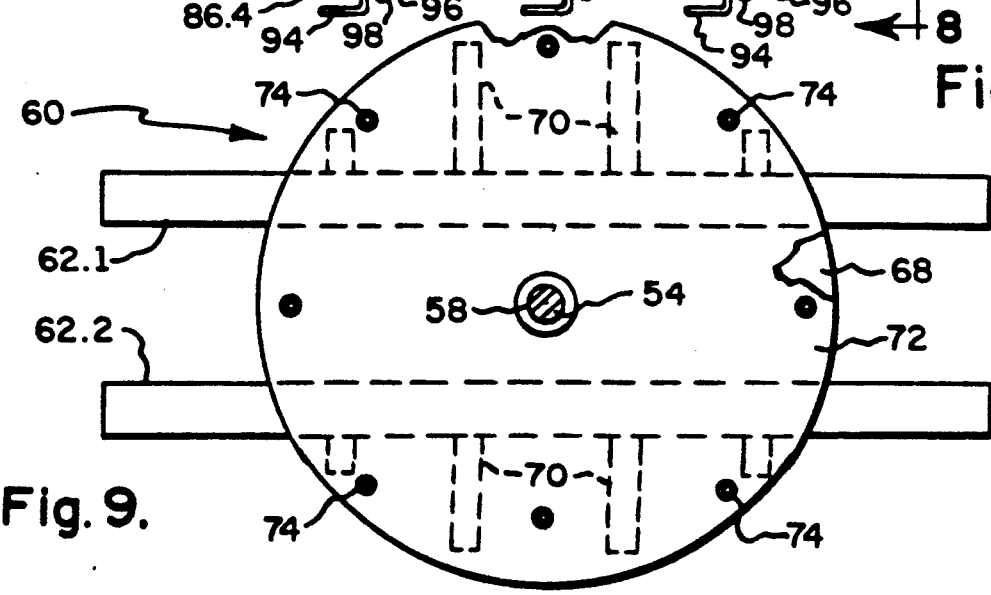

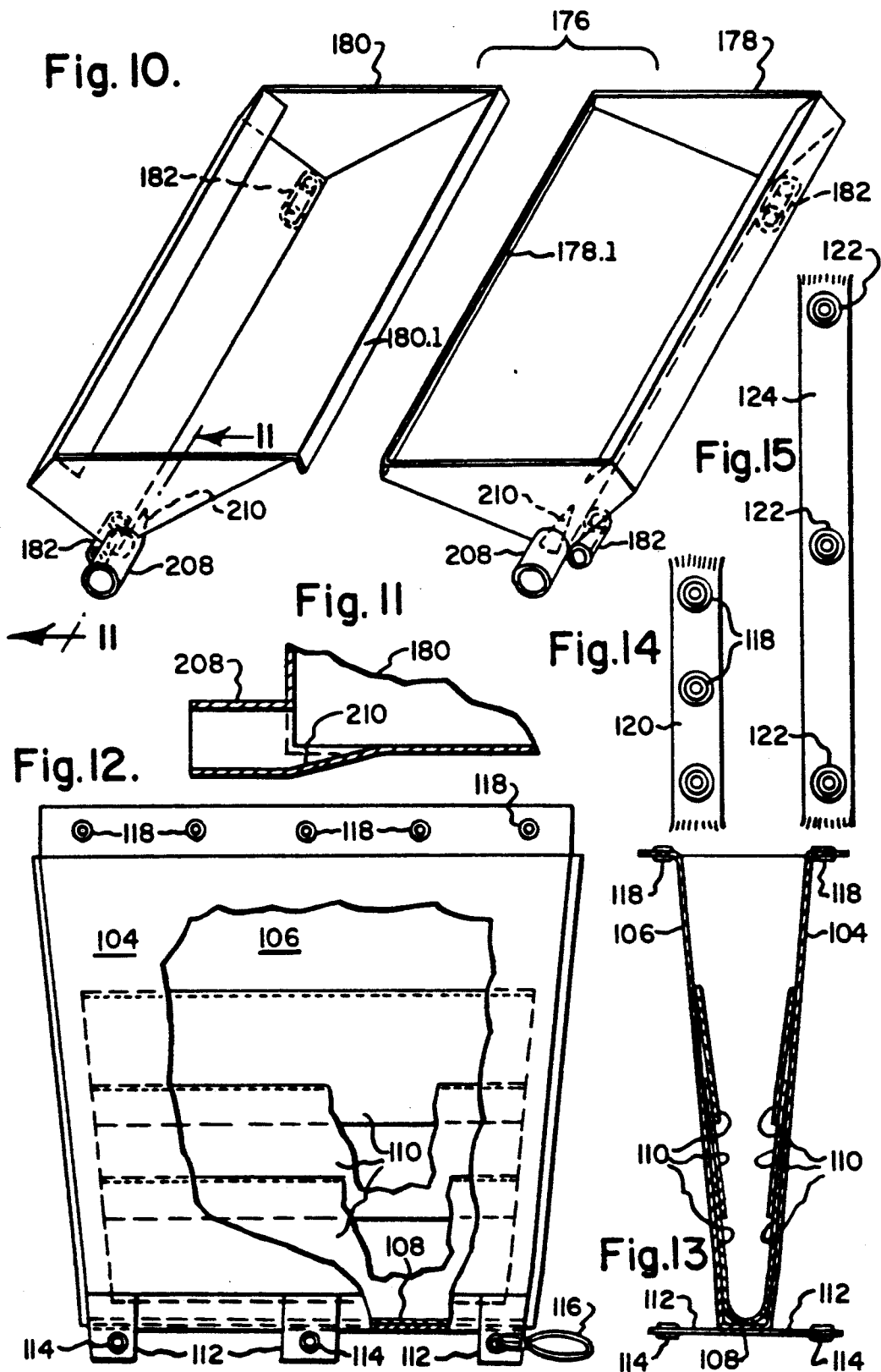

PRESS ASSEMBLY FOR EXTRACTING LIQUIDS FROM SOLIDS

TECHNICAL FIELD

The present invention relates generally to a press assembly for squeezing liquid from layers of liquid containing materials, and more particularly to a press of the type which has particular application for squeezing juice from fruit, which press can readily discharge the residue from a plurality of filter bag assemblies disposed between press racks (or plates) after the juice has been squeezed from the fruit, the various components of the press being assembled together in a novel manner which facilitates the operation of the press under a variety of conditions.

BACKGROUND OF THE INVENTION

By way of background, it has been found that the best apple cider is made by pressing relatively thin layers of apple pomace, the pomace having been wrapped in cloth which is placed between adjacent press racks or press plates. Prior to the development of U.S. Pat. No. 4,892,665 this procedure was extremely labor-intensive because each layer had to be initially wrapped in a separate cloth and then placed between racks for pressing, and after pressing the cloth had to be unwrapped manually to dispose of the pomace residue, which is called press cake. The cider press shown in U.S. Pat. No. 4,892,665, (which was developed by the applicant of the present invention) was designed to overcome the foregoing disadvantages. This prior art cider press has a centrally located moveable platen and fixed platens to either side. A plurality of press racks or plates are disposed between the platens, the racks in turn being supported by a scissor linkage. When the moveable platen moves towards or away from a fixed platen it causes corresponding movement of the scissor linkage, the scissor linkage in turn causing corresponding movement of the press racks. Filter bags are supported by and between adjacent racks. When the racks are moved to their spaced apart position, the open filter bags are filled with the fruit which is to be pressed. Then the moveable platen will be moved toward the fixed platen, causing the scissor linkage to cause corresponding movement of the racks, which will in turn press the fruit within the filter bags. At the completion of the pressing operation the movable platen will be moved back to its open position. With this design it is not necessary to close the top of the press bags during pressing.

In order to avoid undue stress on the scissor linkage of the design shown in the foregoing patent, the fruit which is to be pressed should be evenly distributed within each press section, each filter bag receiving about the same amount of fruit, and the fruit within each filter bag being evenly distributed from side to side. If this even distribution does not occur, or if each bag does not receive the same amount of fruit, it has been found that the pressing forces may have to be borne by the adjacent scissor linkage, causing undue stress on the linkage. This requires that the scissor linkage be designed to withstand the press forces. For example, when a filter bag is not filled and it is next to a filter bag that is completely filled, the press forces for the empty filter bag must be borne by the adjacent scissor linkage, as there is no fruit within the empty filter bag to absorb the press forces. As the scissor linkage must have sufficient strength to withstand maximum press forces, it has been necessary to make the links of the scissors linkage of relatively thick bar stock. Because of this, it had been found that the scissor links will contact each other before the press racks do, thus restricting the pressing operation when the filter bags are not filled with the proper amount of material.

It has also been found when using the design of the forgoing patent, that if the fruit to be pressed is soft and mushy that the press racks may move from side to side causing undue stress upon the machine. It is also been found in the prior machine, that there are additional structural requirements due to the lifting of the filter bags and all of the associated structure as the filter bags are moved from their normal working position to an inverted position to one side of the machine.

Other forms of presses are known which carry material receiving a plurality of containers. One such design is shown in U.S. Pat. No. 424,543 which is designed for pressing oil from cotton seed or the like. This design includes a plurality of press boxes supported by guide rods on each side of the press boxes, each press box including it own plunger. The design shown in this patent requires the use of press boxes which must be closed prior to pressing, which cannot be readily removed from the machine for cleaning, and which also requires that the press cake be ejected upwardly at the completion of the pressing operation.

Other prior designs are shown is U.S. Pat. Nos. 1,107,487, 3,289,844, 4,076,033, 4,343,710, 4,900,436, 5,037,540 and 5,045,186. However, none of these prior art patents utilize filter bag assemblies that can be readily installed and removed from a press for rapid sanitation and replacement, which filter bag assemblies have been found to be useful when the best tasting juice is desired, and which have other operational and structural deficiencies.

OBJECTS AND FEATURES OF THE INVENTION

It is accordingly an object of the present invention to provide an improved press assembly which will squeeze liquid from liquid containing solid materials, the assembly simultaneously pressing a plurality of layers of liquid bearing material, Wherein the material is supported in open top filter bag assemblies during pressing, which filter bag assemblies need not be evenly filled, and wherein the press cake and filter bag assemblies may be readily removed from the apparatus for replacement by a new set of filter bag assemblies, which may take place while the original set is being cleaned.

Thus, it is present invention to provide press assembly for squeezing liquids from liquid containing solids, the press including a pair of platens which may be moved together, there being a plurality of spaced apart horizontally extending support rods extending between the platens, a plurality of press plates or racks supported by the rods, the press racks being in the form of plates, a plurality of open top filter bag assemblies, each filter bag assembly being supported by and disposed between adjacent press plates or racks, force applying means for moving the platens together to squeeze liquid from the liquid containing solids received within the filter bags, and collector means disposed below the press racks or plates and capable of collecting liquids which are squeezed from the liquid containing solids during the squeezing portion of the operation.

It is a further feature of the present invention to provide, in an apparatus of the type set forth above, connecting means which connect the press racks together,, the force applying means when moving the platens away from each other causing the connecting means to progressively open up the press racks to determine their spacing away from each other when the force applying means has the moved the platens to their full open position.

It is another feature of the present invention provide a press assembly having a plurality of press racks and open top filter bags alternately supported on parallel support rods, there being force applying means for moving the press racks together to cause liquid to be squeezed from solid material received within the filter bags, and wherein novel collector means are disposed below the filter bags, the novel collector means including two parallel troughs which are mounted for pivotal movement between a normal operative position, where the lip of one trough overhangs the lip of another trough, and an inoperative position where the two troughs are spaced to the sides of the press racks and bags.

It is an additional re of the present invention to provide a press assembly having a plurality of alternating press racks and filter bags which may be moved towards each other after the filter bags have been filled with the material which is to be squeezed, the liquid squeezed from the material being collected in collector means disposed below the filter bags, and wherein the press racks and filter bags may be inverted to discharge press cake from the filter bags, there being conveyer means mounted below the collector means, and wherein the collector means may be moved to an out of the way position when the press rack and filter bags are inverted.

The above features as well as other objects and advantages of the present invention will be more fully understood after a consideration of the following detailed description taken in conjunction with the accompany drawings in which a preferred form of the present invention is illustrated.

BRIEF DESCRIPTION OF THE DRAWINGS

FIGS. 6 and 7 are side elevational views taken generally along the lines 6—6, and 7—7 in FIG. 5.

FIG. 8 is a view taken generally along the line 8—8 in FIG. 7.

FIG. 9 is a view taken generally along the line 9—9 in FIG. 5.

FIG. 10 is a perspective view of two collector troughs utilized with this invention.

FIG. 11 is a sectional view taken generally along the line 11—11 in FIG. 10.

FIG. 12 is a side view of the filter bag assembly which may be utilized with this invention.

FIG. 13 is a sectional view taken through the filter bag assembly shown in FIG. 12, the bag being shown in this view in that position which it would assume immediately before filling.

FIG. 14 is a view of the strap which may be used for connecting press racks together.

FIG. 15 is an alternate embodiment of the strap shown in FIG. 14.

DETAILED DESCRIPTION

Figure 1:
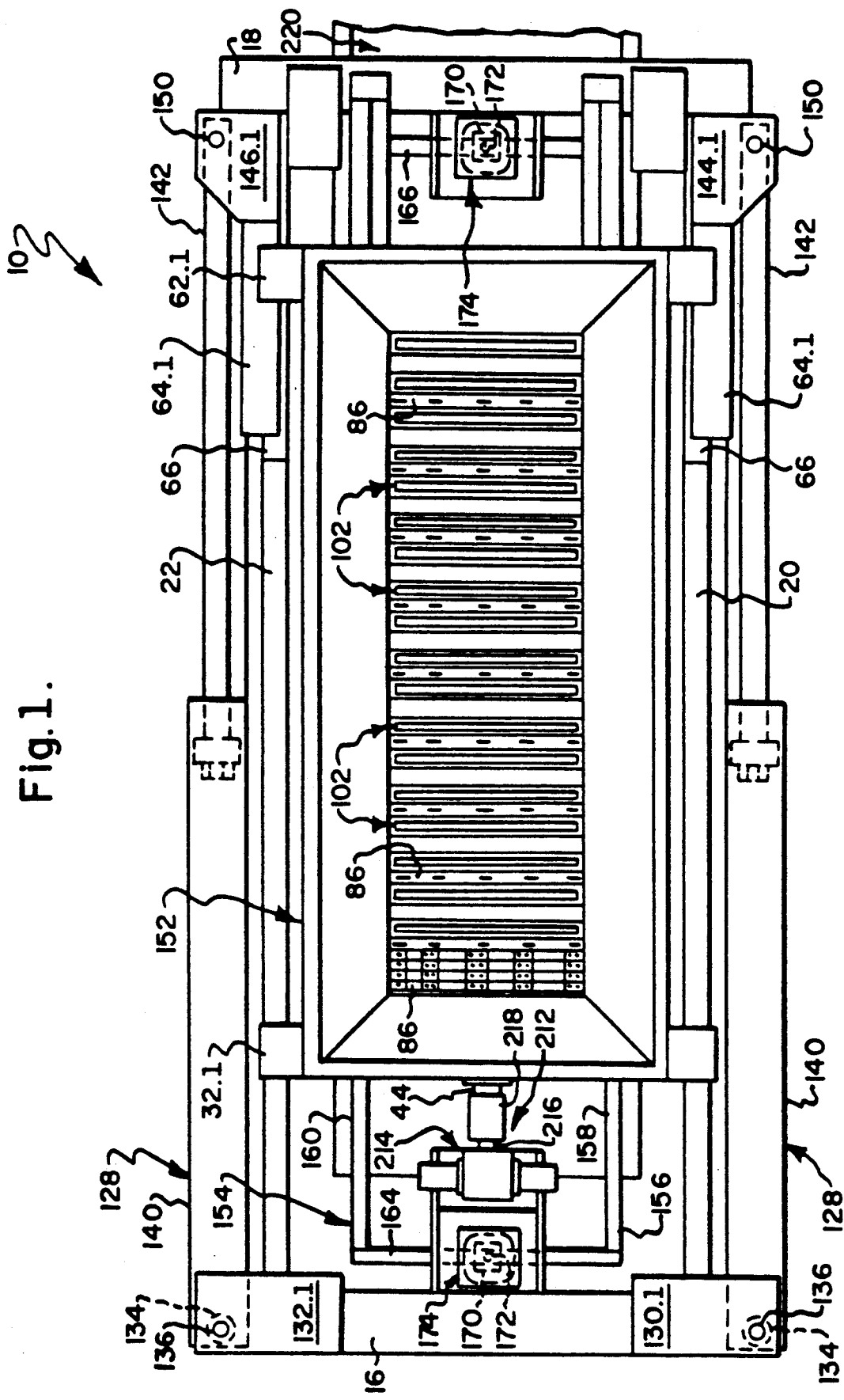
FIG. 1 is a plan view of the press assembly of this invention.

The press assembly of this invention is indicated generally at 10. The operative components of the press assembly of this invention are mounted upon a mobile frame which includes four corner vertical upright 12, each of the upright frame members being shown as having a caster wheel assembly 14 mounted at its lower end. Left and right transversely extending frame members 16 and 18, respectively, are welded to the upper ends of the vertical uprights 12. As can best be seen from FIGS. 3 and 4, the press frame further includes front and rear spaced apart frame members 20, 22. Additional frame members may be provided such as, for example, the intermediate front and rear horizontal frame members 24 and 26, respectively, which are bolted by means of bolts 28 to the vertical uprights 12.

Extending between front and rear frame members 24, 26 is a transversely extending rigid abutment frame indicated generally at 30, the frame also being between the right and left frame members 16 and 18. The abutment frame 30 includes upper and lower transversely extending box beams 32.1 and 32.2 which have their ends welded to the front and rear horizontally spaced frame members 20, 22. The transversely extending frame additionally include a hexagonal plate 34 which is welded to the face of the transversely extending box beams 32.1 and 32.2. Reinforcing gussets 36 are welded to the top of the top beam 32.1 and the back face of hexagonal plate and additional reinforcing gussets, also numbered 36, are welded to the bottom box beam 32.2 and to the back face of the hexagonal plate 34. This reinforcing structure is enclosed by a cover 38. Additional reinforcement plates 40 may also be provided in between the beams 32 and behind the hexagonal plate 34. As can be seen the hexagonal plate, because of its rigid connection to the beams 32, which are in turn are rigidly secured to the front and rear horizontal spaced apart frame members 20, 22, will provide a rigid abutment.

Figure 5:
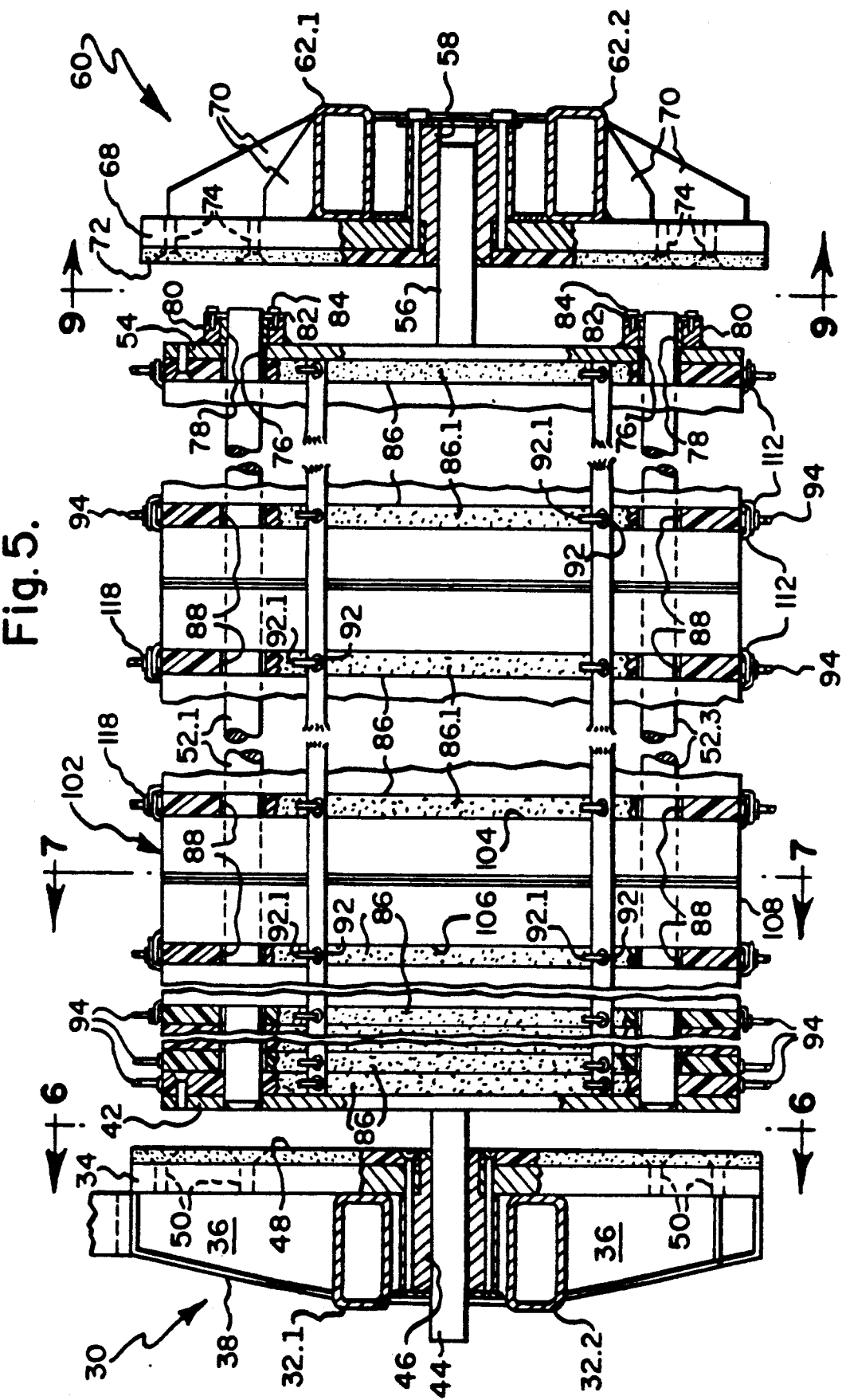
FIG. 5 is an enlarged front elevational view of a portion of the apparatus shown in FIG. 2, parts having been eliminated for purposes of clarity.

A first platen 42 is mounted to the right of the rigid transversely extending frame 30, the first platen 42 being a generally rectangular plate, which preferably is of stainless steel. A first shaft 44 is welded to the center of the first platen, the shaft being perpendicular to the platen. The first shaft 44 mounts the first platen for rotational movement with respect to the fixed transversely extending frame, and to this end the frame 30 is provided with a centrally located first bearing block 46 which receives the first shaft 44 for rotation therein. The first bearing block 46 is mounted between the upper and lower box beams 32.1 and 32.2. As the platen 42 will have force applied upon it in the direction of the transversely extending frame 30, a first thrust bearing 48 is disposed between the platen and the hexagonal plate 34, the thrust bearing being in the form of a large plastic sheet or plate, such as for example polyethylene, which is screwed onto the outer face of the hexagonal plate 34 by screws 50. A plurality of parallel spaced apart generally horizontally extending support rods 52 are rigidly secured to the first platen 42. To this end, the first platen is provided with 4 corner apertures (no number) and one end of each of the rods 52 is telescoped into the aperture, the end face of the rod being in the same plane as the left hand face of the platen 42 as viewed in FIG. 5, the rod being welded to the platen in such a manner that no weld flash extends above the surface of the platen. There are preferably four rods 52, there being an upper front rod 52.11 an upper rear rod 52.2, a lower front rod 52.3 and lower rear rod 52.4.

The right hand end of the rods are supported in a second platen 54, the second platen having a second shaft 56 rigidly secured thereto, second shaft 52 in turn being rotatably supported in a second bearing block 58. The block 58 is in turn supported by a slidable transversely extending second abutment frame indicated generally at 60. The slidable transversely extending second abutment frame is similar to the rigid transversely extending first abutment frame 30 in that it includes upper and lower transversely extending box beams 62.1 and 62.2. The ends of the box beams 62.1 and 62.2 are in turn welded to forward and rear channel members 64.1 and 64.21 respectively. Each of the front and rear channel members is in turn supported upon a linear slide bearing 66 carried by the upper surface of the associated horizontal spaced apart frame member 20 or 22. The linear bearings may be thick sheets of plastic. The second abutment frame further includes a circular plate 68 which is welded to the transversely extending box beams 62.1 and 62.2, and gussets 70 which extend between the box beams 62 and the plate 68. A second thrust bearing 72 is disposed between the second platen 54 and the circular plate 68, the second thrust bearing being secured to the circular plate by screws 74.

It should be apparent from an inspection of FIG. 1 that if the first or left hand platen 42 were caused to be rotated that the rods 52 and any structure supported by them may also be rotated. However, in order to accomplish this it is necessary that there be no interference between the right platen 54 and the box beams 62. To this end, it is necessary the structure which supports the right hand end of the rods which is carried by the platen 54 does not extend beyond the face of the platen 54 which is to the right, as viewed in FIG. 5, a distance greater than the thickness of the thrust bearing 72 and the circular plate 68, this being shown in FIG. 2. To this end, the second platen is provided with four corner apertures 76 through which the rod 52 extend in all positions of the platen 54. When the platen is in its further right hand position, in shown in FIG. 2 the rod will only project a slight distance beyond the right hand face of the platen 54. The rods are in turn slidably supported by bearings 78 received within hubs 80 which are welded to the right hand face of the platen 54 about the apertures 76. Each bearing is trapped within the associated hub by a washer-like retainer 82 which is held in place by bolts 84.

A plurality of press racks 86 are supported by the rods 52 by sliding movement. To this end, each of the racks, which are best shown in FIG. 7, is provided with four corner apertures 88 through which the rods 52 may project, the racks 86 being suspended by the rods 52. The racks 86 in the preferred embodiment are formed of large plastic plates. The front and rear faces of each plate is provided with flutes 90, the flutes being arranged in the manner shown when the rack 86 is in it's normal upright position. A pair of L-shaped hooks 92 is carried by each of the front and rear edges 86.1 and 86.2 of the rack 86, the L-shaped hooks 92 having an upwardly projecting end 92.1. The top and bottom edges 86.3 and 86.4 of the racks 86 are also provided with L-shaped hooks 94, the free ends of the L-shaped hooks all projecting in the same direction, as for example to the front as shown in FIG. 7. The L-shaped hooks 94 are each welded to a strap 96 which is in turn secured in place to the associated edge of the rack 86 by a screw 98. This will prevent the hooks 94 from rotating. A slot 100 is provided in the lower rear corner of each of the press racks. The purpose of the slot 100 will be explained later.

A plurality of filter bag assemblies are supported by the press racks 86, the filter bag assemblies being indicated generally at 102 in FIG. 13. Each of the filter bag assemblies 102 includes a bag made of a suitable filter cloth or the like, the bag having spaced apart major sides 104 and 106, and a bottom 108. A plurality of flaps 110., also made of a suitable filter cloth or the like, are sewn or otherwise secured to the major sides 104 and 106 in a tiered relationship can best be appreciated from FIGS. 12 and 13. Secured to the bottom of each bags are bands 112, each band being provided with a grommet 114 at its outer end. The bands 112 on the rear sides of the bag, as shown to the right of FIG. 12, are provided with an elastic cord 116 which may be passed into the slot 100 to retain the bag in a mounted position when the L-shaped hooks 94 on the bottom edge 86.4 of the press rack 86 receives the grommets on bands 112.

The upper edge of the bag is also provided with suitable grommets 118 which may be passed over the hook 94. As can be seen from FIG. 5, one bag assembly is supported by and disposed between each adjacent pair of press racks 86. The bags are normally held in their upright position, as shown in this FIGURE, with the open top of the bags being held opened so they may received the material which may be subsequently squeezed by the press of this invention. The bottoms are held by the bands 112 which are received by the lower hooks 94.

Figure 2:
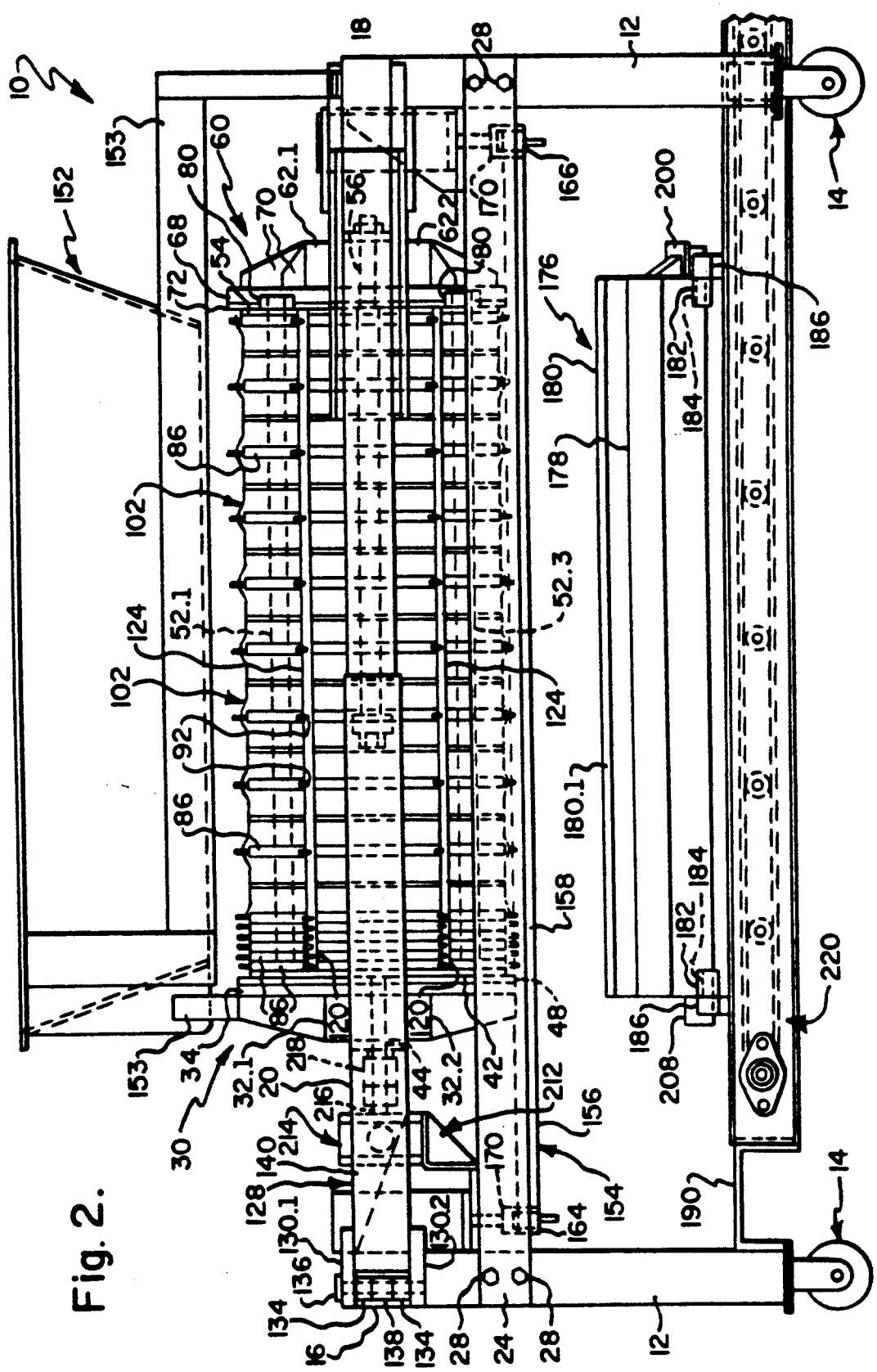
FIG. 2 is a front elevational view of the press assembly of this invention.

Depending upon the size of the press a differing number of press racks 86 may be supported by the rods 52. As shown in FIG. 2, fifteen separate press racks are supported. However, only nine bag assemblies 102 are supported by the racks, there being one bag assembly between each pair of adjacent press racks. The remaining press racks, which are disposed to the left in FIG. 2, are held closely adjacent to each other. To this end, connecting means are provided for connecting the racks together. A preferred form of connecting means includes the L-shaped pins 92 on the sides of the racks 86 and a strap of the type shown in FIGS. 14 and 15, which strap is provided with a plurality of grommets. When it is desired to hold the racks together, as shown to the left in FIG. 2, the strap of the type shown in FIG. 14 is employed. In the strap shown in FIG. 14 the grommets 118 are spaced very close to one another on the strap 120, approximately the same distance as the distance between pins 92 in adjacent press racks when the press racks held together in face to face contact. To connect the racks together in the face to face position it is only necessary to pass the grommets 118 on strap 120 over adjacent pins 92. The grommets preferably have a rubber-like insert which will frictionally engage the pins 92. An alternate design of a strap is shown in FIG. 15. In this FIGURE the grommets 122 are spaced apart a greater distance which will permit the bags to assume a full open position as shown in FIG. 2. While a first strap 120 is shown in FIG. 14 having closely spaced together grommets and while a second strap 124 is shown in FIG. 15 having grommets 122 spaced apart as far as possible, it is also possible for other straps to be provided, which other straps have the grommets dispose closer to one another than what is shown in FIG. 15 but not nearly as close as that which is shown in FIG. 14. This would permit the bag assemblies to be only partially open, as maybe desirable when squeezing soft and mushy fruit.

The bag assemblies are caused to be opened and closed by force applying means, indicating generally at 128, the force applying means being capable of moving the second platen 54 towards the first platen 42 with sufficient force to squeeze liquid form the solid material received within the bag assembly 12, the solid material perhaps being the pulp from apples, grapes, vegetables, or any other product from which liquid is to be extracted from a solid residue. While differing mechanisms may be utilized for shifting the second platen 54 towards the first platen 42, in the preferred embodiment of this invention hydraulic cylinder assemblies are utilized, each cylinder assembly being parallel to one of the front or rear horizontal spaced apart frame members 20, 22, respectively. To this end front and rear upper and lower plates 130.1, 130.2, 132.1 and 132.2 are welded or otherwise rigidly connected to the front and rear ends of the left transversely extending frame member 16. Suitable bushing 134 are secured to adjacent faces of the plates 130, 132 about an aperture within the plate, and a pin 136 is passed through the apertured plates, the bushing, and the anchor end of a cylinder 140. The rod end 142 of the cylinder assembly 128 is similarly connected to the slidable transversely extending second abutment frame 60. Thus, front and rear upper and lower plates 144.1, 144.2, 146.1 and 146.2 are welded to the upper and lower transversely extending box beams 62.1 and 62.2, respectively, the plates being provided with suitable bushings 148 and a pin 150 for securing the rod end 142 of the cylinder assembly 128 to the plates 144, 146.

A distribution hopper, indicated generally at 152, is mounted above the frame. To this end, a frame extension assembly 153 is welded to the transferring extending frame 30 and the right transferring extending frame member 18 in any conventional manner. The frame extension assembly in turn supports the distribution hopper which may be of any conventional structure, the distribution hopper not forming a material portion of this invention. A charge of material, which is to be squeezed, is loaded into the hopper and, through a gate valve or the like,, is permitted to fall by gravity into the filter bag assemblies 102.

In order to insure that the filter bag assemblies 102 are properly loaded and to achieve better drainage, they may be vibrated during loading. To this end vibrating means, indicated generally at 154 are mounted below the press rack. The vibrating means consist of a generally rectangular frame 156 having front and rear bars 158, 160, respectively, each of the bars 158 and 160 having a round bar 162 stitch welded and centered on top of the bar. The bars 158 and 160 are interconnected to each other by left and right transferring extending supports 164, 166. Each of the supports is in turn secured by means of pin 168 and clevis 170 to the lower end of a piston rod 172, the piston end of the piston rod being received within a cylinder assembly 174. The right and left cylinder assemblies are operated together in and up and down manner to bring the round bar 162 in to contact with the lower surface of the racks 86 to vibrate them during loading.

Figure 3:
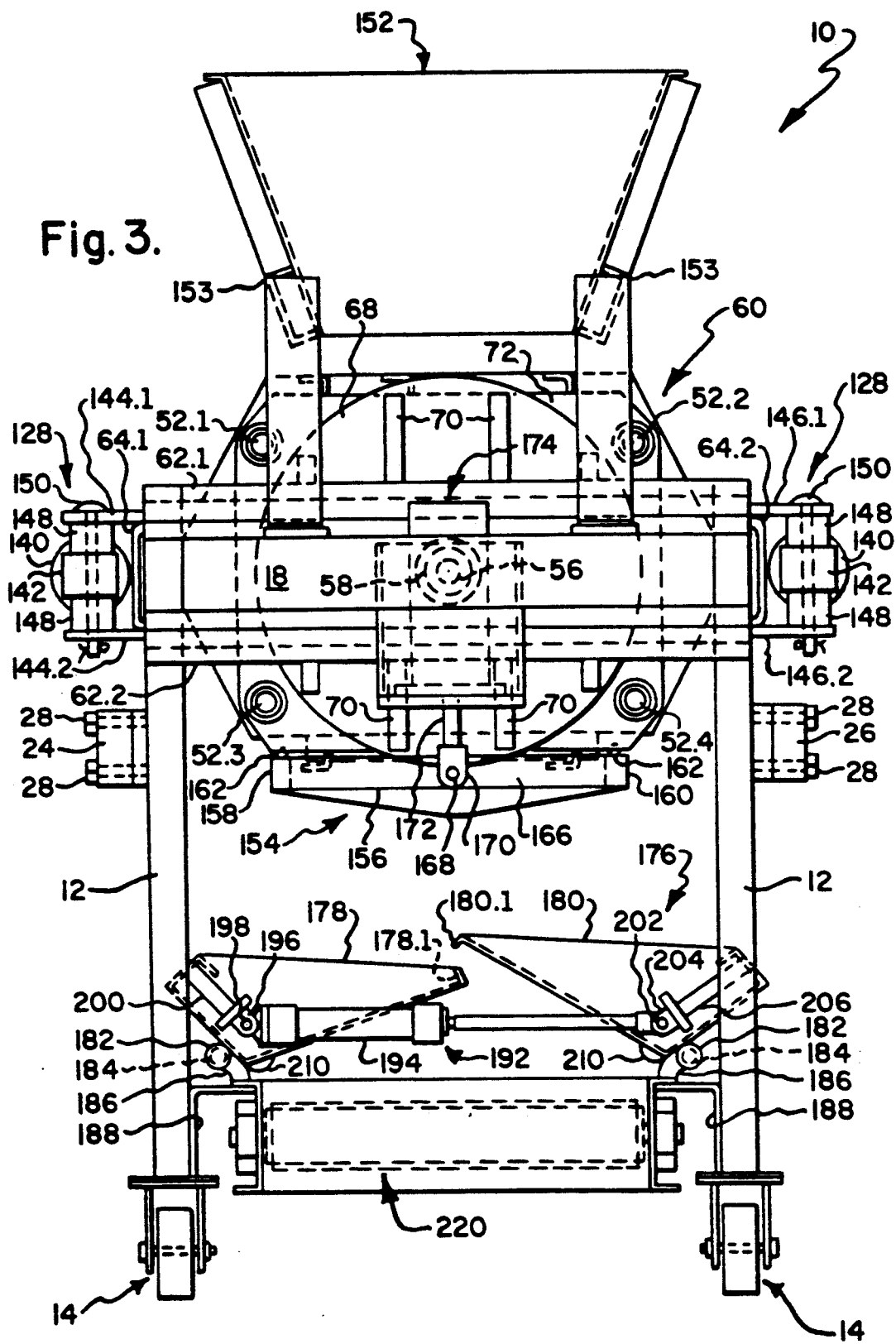
FIG. 3 is a right side elevational view of the press assembly of this invention.
Figure 4:
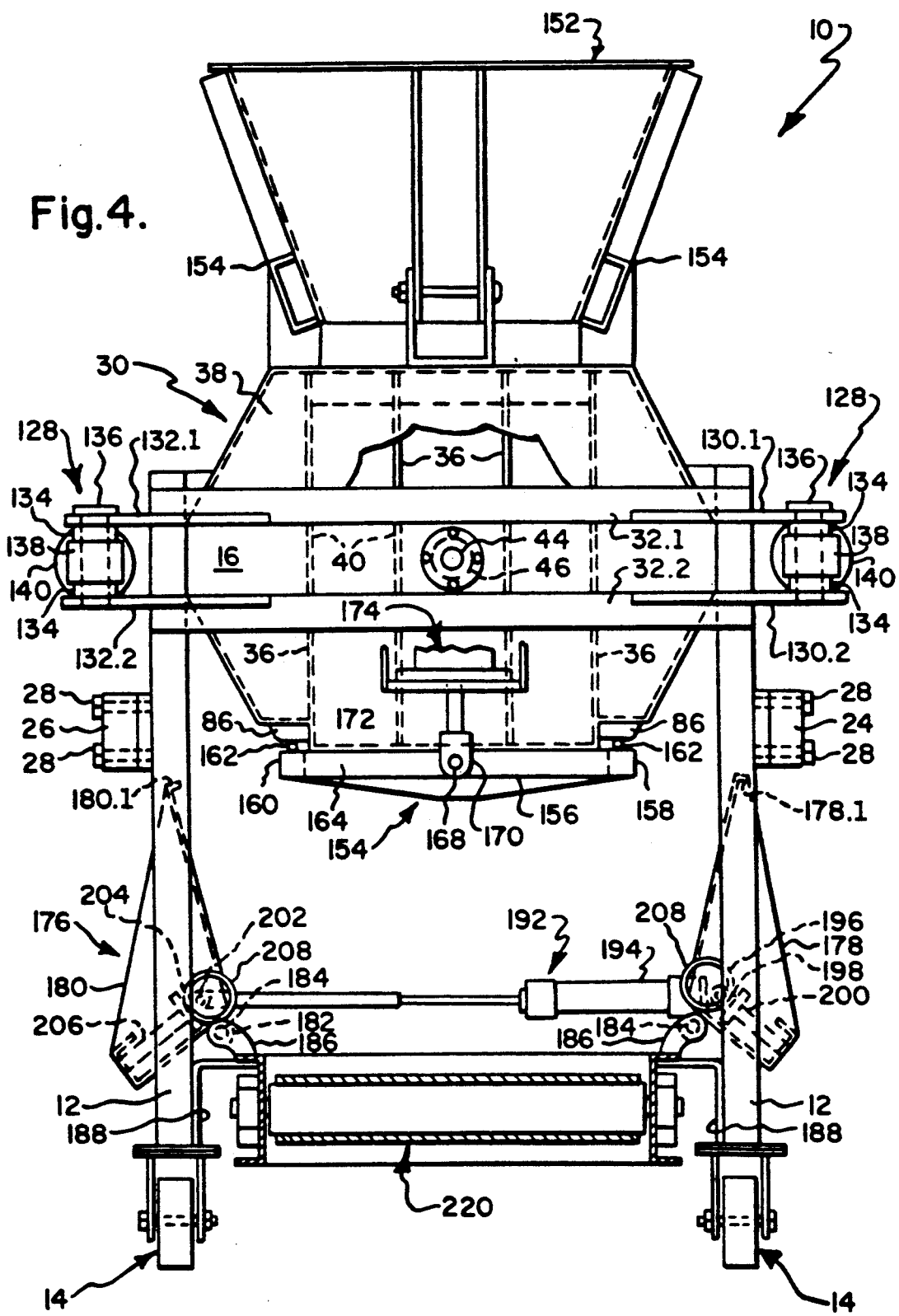
FIG. 4 is a left side elevational view of the press assembly of this invention.

After the filter bag assemblies 102 have been loaded with fruit pulp or the like, the operation of the cylinder assemblies 128 are initiated to squeezed the liquid from the solid material which contains the liquid. When this happens the juice will flow through the filter bags and will fall by gravity into collector means indicated generally at 176, the collector mean being a pair of front and rear parallel troughs 178, 180. Each of the trough is provided with a pair of concentric hubs 182 on an outer surface, the hubs receiving pivot pins 184 carried by brackets 186 which are in turn supported on angle frame members 188. The angle frame members are in turn welded on the right hand side to the vertical uprights 12, and are welded on the left hand side, as can be seen in FIG. 2, to an inverted channel 190 which is in turn welded at its left hand end to the associated left hand vertical uprights 12. As can be seen in FIG. 3, the lip 180.1 of trough 180 overhangs the lip 178.1 of trough 178. When desired, the troughs can be swung from the operative position shown in FIG. 3 to an inoperative position, which is shown in FIG. 4, by means of collector moving means, indicated generally at 192. The collector moving means consists of a double acting hydraulic cylinder assembly including a cylinder 194, the anchor end of which is pivotally secured by means by of pivot pin 196 to a clevis 198, the clevis in turn being supported by a bracket assembly 200 which is welded or otherwise secured to the right hand end of the trough 178. The rod end is similarly connected to the rear trough 180. Thus, a pin 202 secures the rod end to the clevis 204 which is suitably supported by a bracket assembly 206. As can best be seen from FIGS. 3 and 4 the distance between the center of each of the pins 184 and the associated pin 196 or 202 is about equal. However, it can also be seen that the trough 180 has a greater over-hanging mass. Therefore, when the cylinder assembly 192 is retracted from the position shown in FIG. 4, the front trough will drop first and then the second trough will drop with the lip 180.1 overhanging the lip 178.1. Each of the troughs is provided with an outlet tube 208 which is in fluid communication with a recessed portion 210 in the bottom of the associated trough. A discharge hose (not shown) is connected to the outlet tube 208 to convey fluid away from the press of this invention.

At the completion of the pressing operation the cylinder assembly 128 will be extended to move the moveable abutment 60 in the right hand direction to the position shown in FIG. 2 to cause the bag assemblies 102 to open. At this time the troughs will be moved from the position shown in FIG. 3 to the position shown in FIG. 4. The press racks and the filter bag assemblies 102 carried thereby will now be inverted. To this end it must be remembered that the first and second platens 42 and 54 are both journalled for rotation within in concentric first and second bearing blocks 46 and 58, and that the press racks 86 and filter bags assembly 102 are carried by the rods 52 which are secured to the platens. Therefore, it is only necessary impart rotational movement to the shaft 44 to invert press racks and bag assemblies. This end, inverting means, indicated generally at 212 are provided. The inverting means consists essentially of a conventional hydraulically operated rack and pinion assembly 214 which, through a rack and pinion (not shown) causes a shaft 216 to be rotated. As the shaft 216 rotates it will cause corresponding rotation of the shaft 44 through the flexible coupling 218. It should be noted that the moveable platen must be shifted to the full right hand position before the inverting means rotates the press racks and filter bag assemblies. If this were not the case, the rods 52 could contact the transverse beam 62 to which the circular pressure plate 68 is secured.

After the press rack and filter bag assemblies have been inverted, the press cakes within the filter bag assemblies may fall from the press. Since it is desirable that the press cake be conveyed away from the press of this invention, conveyer means, in the form of an endless conveyer 220, is mounted below the collector means. Normally the conveyer means will be covered by the collector troughs when in the collecting position shown in FIG. 3, but as the troughs are moved to a location to the sides of the press racks, when they are moved in the inoperative position shown in FIG. 4, any press cakes within the filter bag assemblies 102 are free to fall upon the endless conveyer. As the endless conveyer is of a well known construction, it will not be described in detail other than to note that the drive means are not shown as the drive means is to the right of the view shown in FIG. 2. The conveyer is in turn secured in any suitable manner to the L-shaped brackets 188 as shown in FIGS. 3 and 4 It is believed that the operation of the press assembly of this invention should be apparent from the foregoing description. By utilizing the press of this invention the disadvantages of the prior art have been overcome. Thus, it is no longer essential that even loading of the filter bag assemblies be accomplished in order to provide for proper squeezing of all of the fruit pulp received in the press. In addition, it is very easy to remove the press cake from the apparatus shown and described above, in that it is only necessary to invert the press rack and the filter bag assemblies to permit the press cake to drop from the filter bags as they peel away from the flaps. If necessary, in order to increase the speed of the peeling of the press cakes from the flaps the press racks can be vibrated when in their inverted position by mean of the vibrating means 154 which is also utilized to fill the press. The press cake which falls from the machine can be conveyed by the endless conveyer 220. Upon the completion of the operation the inverting means will then return the parts to their original position and a further sequence of operations can be preformed. This sequence may be carried out automatically by a programmable controller, in conjunction with sensors for pressure, flow of juice, and the like according to modern engineering principles.

While a preferred form of this invention has been shown and described above, it should be understood that other forms of this invention may occur to those having ordinary skill in the art. Therefore applicant does not intend to be limited to the particular details shown and described above, but that, in fact, intends only to be limited by the following claims.

What is claimed is:

1. A press assembly for extracting liquids from solids; the press assembly comprising:
    a press frame;
    a first platen carried by the frame;
    a plurality of parallel spaced apart horizontally extending support rods secured to the first platen;
    a second platen carried by the frame and supporting an end portion of each of the parallel support rods for sliding movement;
    a plurality of press racks, each press rack being of a plate like construction having an upper edge and side edges;
    means for mounting the press racks on the parallel support rods between the first and second platens for only sliding movement on the support rods;
    a plurality of filter bags supported by and between adjacent press racks, the bags having open tops;
    force applying means for moving the second platen towards the first platen with sufficient force to squeeze liquid from solid materials received within the filter bags supported between the press racks;
    collector means disposed below the press racks and capable of collecting liquids which are squeezed from the material received within the filter bags as the second platen is moved towards the first platen by the force applying means; and
    inverting means for moving at the same time all of the press racks and filter bags from their normal upright 2. The press assembly as set forth in claim 1 wherein each of the first and second platens is secured to a shaft for rotation therewith, the press assembly further comprising bearing blocks supported by the press frame, each shaft being rotatably mounted within an associated bearing block.

3. The press assembly as set forth in claim 1 wherein the first and second platens are journalled for rotation within the press frame about concentric axes, wherein the collector means is normally disposed below the press racks when they are in their normal upright position, and wherein the press assembly further comprise conveyor means mounted below the press racks, the conveyor means being capable of conveying away press cake from the machine which may fall after the press racks are inverted.

4. The press assembly as set forth in claim 1 wherein the frame includes two parallel frame members which extend in a direction parallel to the support rods, the frame members being rigidly interconnected to each other, wherein there is a transversely extending frame secured adjacent one end of the two parallel frame members, wherein the first platen is secured to a first shaft which extends through the transversely extending frame, and wherein a thrust bearing is disposed between the first platen and the transversely extending frame.

5. The press assembly as set forth in claim 4 wherein a slidable transversely extending abutment member is slidably mounted upon the first and second parallel side frame members, the slidable abutment member being provided with an aperture, a second shaft, the second shaft being rigidly secured to the second platen and projecting through the aperture in the slidable abutment member, and wherein there is a thrust bearing mounted between the second platen and the slidable abutment member.

6. The press assembly as set forth in claim 5 wherein the force applying means is a pair of double acting hydraulic cylinder assemblies, each cylinder assembly having a rod end and an anchor end, there being one cylinder assembly associated with each of the two parallel frame members, the anchor end of each of the cylinder assemblies being rigidly interconnected with the associated parallel frame member, and the rod end of each of the cylinder assemblies being interconnected with the slidable abutment member.

7. The press assembly as set forth in claim 1 wherein each of the press racks is provided with pins carried by the side edges of the press racks, the pins being in an L-shaped form with the free end of the L-shaped pin extending in an upward direction, and wherein connecting means are provided for connecting the press racks together, the connecting means being straps disposed to either side of the press racks, the straps being provided with grommets which may be passed over the free ends of the L-shaped pins on the side edges of the racks.

8. The press assembly as set forth in claim 7 wherein the connecting means are a first set of straps with closely spaced together grommets which hold a plurality of press racks from movement with respect to an associated fixed press rack, and a second set of straps with a further set of spaced apart grommets which permit relative movement of the associated press racks.

9. The press assembly as set forth in claim 1 wherein four parallel spaced apart support rods are secured to the first platen, and wherein the means mounting the press racks on the parallel support rods are apertures in the corners of each of the press racks, one of the support rods slidably passing through an associated aperture in each of the press racks.

10. The press assembly as set forth in claim 1 wherein the upper edge of each of the press racks is provided with upwardly extending hooks, the upper edges of each of the filter bags being provided with grommets, the hooks on the press racks receiving the grommets so that the filter bags may be easily removed and replaced.

11. The press assembly as set forth in claim 10 wherein the upper edges of adjacent filter bags overlap.

12. The press assembly as set forth in claim 1 wherein each of the filter bags is provided with opposed flaps which facilitate the discharge of the press cakes from each of the filter bags when the bags are in their inverted position, each flap being secured only at its upper edge when the press bags are in their normal upright position.

13. A press assembly for extracting liquids from solids; the press assembly comprising:
  a plurality of parallel spaced apart horizontally extending support rods;
  a plurality of press racks mounted on the parallel support rods for sliding movement relative to each other, each press rack being of a plate like construction;
  a plurality of filter bags supported by and between adjacent press racks;
  force applying means for moving the press racks towards each other with sufficient force to squeeze liquid from solid materials received within the filter bags supported between the press rack;
  collector means disposed below the press racks and capable of collecting liquids which are squeezed from the material received within the filter bags, the collector means including first and second collector troughs which extend in a direction parallel to the spaced apart horizontally extending support rods, each through having sides parallel to the spaced apart horizontally extending support rods, the collector troughs being mounted for pivotal movement and the troughs being movable between a normal position where they are spaced below the filter bags to an inoperative position where they are spaced to the sides of the filter bags, each trough having a lip on the side adjacent the other trough, the lip of one trough overhanging the lip of the other trough when it is in the normal position of the troughts; and
  collector moving means for moving the first and second troughs between the normal liquid receiving position to an inoperative position.

14. The press assembly as set forth in claim 13 wherein inverting means are provided to rotate the press racks from a normal operative position, wherein the filter bags carried between adjacent press racks have an open top disposed in a contents receiving position, to an inverted position where the press cake may fall from the filter bag, and wherein conveyor means are mounted below the two collector troughs when in their normal position, which conveyor means may receive the press cake when the filter bags are in their inverted position and when the first and second collector troughs have been moved to their inoperative position.

15. The press assembly as set forth in claim 13 wherein the collector moving means is an extensible and retractable cylinder assembly carried by the two collector troughs, the cylinder assembly having an anchor end and a rod end, the anchor end of the cylinder assembly being secured to one of the troughs and the rod end being secured to the other trough in such a manner that when the cylinder assembly is retracted the troughs will be maintained in their normal operative position with the lip of one trough overhanging the lip of the other trough, and when the cylinder assembly is extended the troughs will be pivoted to the inoperative position.

16. A press assembly for extracting liquids from solids; the press assembly comprising:
  a plurality of parallel spaced apart horizontally extending support rods;
  a plurality of press racks;
  means slidably mounting the press racks on the parallel support rods for only sliding movement on the support rod;
  mean mounting the support rods and press racks for rotation from a normal position to an inverted position;
  a plurality of filter bags supported by and between adjacent press racks, the bags having open tops when the press racks and support rod are in their normal position;
  force applying means for moving the press racks towards one another to squeeze liquid from solid materials received within the filter bags supported between the press racks;
  collector means disposed below the press racks and capable of collecting liquids which are squeezed from the material received within the filter bags as the press racks are moved towards one another;
  conveyor means disposed below the press racks and capable of conveying press cake;
  inverting means for rotating the press racks and filter bags from the normal position to an inverted position; and
  vibrating means mounted below the press racks, the vibrating means including a pair of spaced apart bars which parallel the support rods, the spaced apart bars being spaced apart a distance greater than the width of the filter bags but less than the width of the press racks so that the bars may contact the racks during filling and whereby, when the press racks are inverted, the press cakes will not hit the vibrating means as they fall from the filter bags.

17. A press assembly for extracting liquids from solids; the press assembly comprising:

a press frame including two generally horizontal spaced apart parallel frame members and a transversely extending frame extending between the two spaced apart parallel frame members, the transversely extending frame functioning as a first abutment and being provided with a first bearing block;

a first thrust bearing carried one face of the transversely extending frame;

a first platen in juxtaposition with the first thrust bearing, the first platen having a first shaft rigidly secured thereto, the first shaft passing through the first thrust bearing and being journalled within the first bearing block;

a plurality of parallel spaced apart generally horizontally extending support rods secured to the first platen;

a second abutment carried by the spaced apart frame members for sliding movement thereon, the second abutment being provided with a second bearing block which is coaxial with the first bearing block;

a second thrust bearing carried by that face of the second abutment on that side which faces the first abutment;

a second platen in juxtaposition with the second thrust bearing, the second platen having a second shaft rigidly secured thereto, the second shaft passing through the second thrust bearing and being journalled within the second bearing block, the second platen being provided with plurality of parallel spaced apart bearings which received the plurality of spaced apart horizontally extending support rods for sliding movement thereon;

a plurality of press racks;

means slidably mounting the press racks on the parallel support rods between the first and second platens for only sliding movement on the support rods;

a plurality of filter bags supported by and between adjacent press racks; and force applying means for moving the second platen towards the first platen with sufficient force to squeeze liquid from solid materials received within the filter bags.

18. The press assembly as set forth in claim 17, wherein inverting means are provided which extend between the frame and the first shaft for rotating the first shaft, the first platen, the parallel spaced apart support rods carried by the first platen as well as the second platen about the axis of the bearing blocks to move the press racks and the filter bags from their normal upright position to an inverted position whereby press cakes bags may fall from the filter bags.

* * * * *

UNITED STATES PATENT AND TRADEMARK OFFICE
CERTIFICATE OF CORRECTION

PATENT NO.  : 5,275,097
DATED       : Jan. 4, 1994
INVENTOR(S) : Dale E. Wettlaufer It is certified that error appears in the above-identified patent and that said Letters Patent is hereby corrected as shown below:

Col. 10, line 20, after "right" insert --position to an inverted position so that the press cake within all the bags may fall from the bags by gravity.--
Col. 10, line 32, delete "comprise" and insert --comprises--.
Col 11, line 58, delete "through" and insert --trough--.
Col. 11, line 68, delete "troughts" and insert --troughs--.

Signed and Sealed this

Seventh Day of June, 1994

*Attest:*

BRUCE LEHMAN

*Attesting Officer*       Commissioner of Patents and Trademarks